US009165053B2

(12) United States Patent
Hernandez et al.

(10) Patent No.: US 9,165,053 B2
(45) Date of Patent: Oct. 20, 2015

(54) MULTI-SOURCE CONTEXTUAL INFORMATION ITEM GROUPING FOR DOCUMENT ANALYSIS

(71) Applicant: Xerox Corporation, Norwalk, CT (US)

(72) Inventors: Andres Quiroz Hernandez, Rochester, NY (US); Shanmuga-nathan Gnanasambandam, Victor, NY (US); Shi Zhao, Rochester, NY (US); Haengju Lee, Webster, NY (US); William Voll, Rochester, NY (US); Gary Morey, Rochester, NY (US); David Cacciola, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 166 days.

(21) Appl. No.: 13/840,186

(22) Filed: Mar. 15, 2013

(65) Prior Publication Data

US 2014/0280150 A1    Sep. 18, 2014

(51) Int. Cl.
*G06F 17/30* (2006.01)

(52) U.S. Cl.
CPC .... *G06F 17/30598* (2013.01); *G06F 17/30412* (2013.01); *G06F 17/30489* (2013.01)

(58) Field of Classification Search
USPC .......................................................... 707/737
See application file for complete search history.

(56) References Cited

U.S. PATENT DOCUMENTS

| | | | | |
|---|---|---|---|---|
| 6,886,010 | B2 * | 4/2005 | Kostoff | 1/1 |
| 7,895,193 | B2 * | 2/2011 | Cucerzan et al. | 707/721 |
| 7,958,125 | B2 * | 6/2011 | Yan et al. | 707/737 |
| 8,386,487 | B1 * | 2/2013 | Ben-Artzi et al. | 707/737 |
| 8,423,551 | B1 * | 4/2013 | Ben-Artzi et al. | 707/737 |
| 8,484,245 | B2 | 7/2013 | Ha-Thuc | |
| 8,996,625 | B1 * | 3/2015 | Singleton et al. | 709/206 |
| 9,064,024 | B2 * | 6/2015 | Oestlien et al. | 1/1 |
| 2005/0125422 | A1 * | 6/2005 | Hirst | 707/100 |
| 2006/0053156 | A1 * | 3/2006 | Kaushansky et al. | 707/102 |
| 2008/0215607 | A1 * | 9/2008 | Kaushansky et al. | 707/102 |
| 2008/0249786 | A1 * | 10/2008 | Oldham et al. | 705/1 |
| 2009/0109872 | A1 * | 4/2009 | Skubacz et al. | 370/254 |
| 2009/0177484 | A1 * | 7/2009 | Davis et al. | 705/1 |
| 2011/0072052 | A1 * | 3/2011 | Skarin et al. | 707/794 |
| 2011/0137921 | A1 * | 6/2011 | Inagaki | 707/749 |
| 2011/0213655 | A1 * | 9/2011 | Henkin et al. | 705/14.49 |
| 2011/0289088 | A1 * | 11/2011 | Yarin et al. | 707/738 |
| 2011/0302124 | A1 * | 12/2011 | Cai et al. | 706/52 |
| 2012/0246097 | A1 * | 9/2012 | Jain et al. | 706/12 |

(Continued)

OTHER PUBLICATIONS

Blei, D.; Ng, A; and Jordan, M. "Latent Dirichlet Allocation", Journal of Machine Learning Research 3, (Jan. 2003), pp. 993-1022.

(Continued)

*Primary Examiner* — Cam-Linh Nguyen
(74) *Attorney, Agent, or Firm* — Fay Sharpe LLP

(57) ABSTRACT

A method and system for processing informational items originating from a plurality of information sources into a derived document for topical analysis thereof. Informational items are collated from a one of the sources in accordance with a predetermined plurality of relevant attributes and a key property value of common to select ones of the relevant attributes. Informational items are then grouped from the plurality of sources associated with the key common property value to form a document, wherein the informational items therein are marked on the informational source thereof. The document is then analyzed for topical identification.

17 Claims, 4 Drawing Sheets

(56) References Cited

U.S. PATENT DOCUMENTS

| | | | |
|---|---|---|---|
| 2012/0296891 A1* | 11/2012 | Rangan | 707/722 |
| 2012/0296967 A1* | 11/2012 | Tao et al. | 709/204 |
| 2013/0246046 A1* | 9/2013 | Fan et al. | 704/9 |
| 2014/0236943 A1* | 8/2014 | Li et al. | 707/736 |
| 2014/0278769 A1* | 9/2014 | McCandless et al. | 705/7.31 |

OTHER PUBLICATIONS

Kang Yujie, Yu Nenghai "Soft-Constraint Based Online LDA for Community Recommendation", Proceedings of PCM'10 (Advances in multimedia information processing, and 11$^{th}$ Pacific Rim Conference on Multimedia; Part II), 2010.

Si, Xiance and Sun, Maosong, "Tag-LDA for Scalable Real-time Tag Recommendation", Journal of Information & Computational Science 6:, Jan. 2009, pp. 23-31. Copyright 2009 Binary Information Press.

Xu, Guandong, Zhang, Yanchun, and Yi, Xun, "Modelling User Behaviour for Web Recommendation Using LDA Model", Proceeds of International Conference on Web Intelligence and Intelligent Agent Technology, IEEE/WIC/ACM, Dec. 9-12, 2008, pp. 529-532. ISBN: 97807695-3496-1.

* cited by examiner

MULTI-SOURCE CONTEXTUAL INFORMATION ITEM GROUPING FOR DOCUMENT ANALYSIS

FIELD

The subject embodiments relate to the document organization arts, document processing arts and document analysis arts.

BACKGROUND

Any entity that involves interpersonal communications can have a useful need for the storage and analysis of such communications. Businesses regularly log such communications as a conventional business process. Such communications will typically comprise information items such as logs, notes and events from ordinary business and software processing. More particularly, for web transactions and web based activity, such items will comprise of web logs, customer service representative notes, phone call logs, and event logs. Such informational items and contact logs when analyzed can be helpful in generating useful information about the topics or participants to the communications. Prior known methods for such analysis will typically group the informational items into logical groups, i.e., website visits or call center phone calls, and then analyze and act on the groupings rather than on the individual logs themselves. Such groupings make sense when the information content in any single log item is small for conventional and regular document analysis techniques. The subject embodiments provide improved methods and systems for enabling the application of models to informational data from multiple disparate sources for improved logical groupings thereof into analyzable documents.

A particular problem with conventional automated record keeping systems which generate business and software processes logs, notes and key events for maintaining ordinary records for business or legal purposes, is that at the level of a single log the information content is too low to yield useful analysis with common document topical analysis techniques. Known document analysis techniques, such as latent dirichlet allocation (LDA) often operate on documents with larger information content. While LDA clusters on large information sets, it does not inherently provide ways to consider groupings of transactional information with low information content. To take advantage of such analytical techniques, the logs, notes and key events from available data sources need to be grouped into meaningful categories as applicable to a business, organization or workflow. The power and flexibility of LDA is further enhanced after establishing such logical groupings and norms to label these logical groupings.

A particular problem addressed by the subject embodiments is that known systems establish logical groupings for document analysis are based upon forming silos of information from particular information sources. For example, phone call information is treated differently from webserver traffic even though there are techniques and needs to view them in conjunction, for example, as logical information groupings from call and web logs. The clustering of information solely based upon one source, or some other defined silo, restricts the usefulness of the results when analysis techniques such as LDA are applied to the information groupings.

BRIEF DESCRIPTION

The low, per record information content in web logs, customer service representative notes, phone call logs and event logs is a barrier to clustering analysis using techniques such as latent dirichlet allocation (LDA). As a result, rather than viewing these as per record items there is a need to look at these logical groups in appropriate analysis sizes. When information groupings are sizable, they have enough content so that known document analysis techniques can be applied. In some cases, sessions that occur during a given period (say day, work period, quarter etc.) make sense. In cases of phone logs, all sessions until an issue is closed may be grouped. In a multi-domain sense, all the web activity up until a phone call or series of phone calls of a certain topic may be grouped as well. In any case, automatically grouping these logs is the subject of the preset embodiments. The difficulty in achieving such groupings is complicated when data from multiple sources have to be accommodated into these groups without losing distinguishability as to the source of the data. The subject embodiments take data from multiple sources that have links between them to construct individual documents. Each document represents a common property value (key), while its contents are elements drawn from each source that are linked by that key. Unique markers are used to tag the elements from the different sources, but this tagging is transparent to LDA, so that no change to the LDA processing or other known text clustering algorithm is necessary. The tags are then used to extract data from the results in order to find previously unknown associations between data sources. In particular, the embodiments comprise a mechanism in terms of data from the interaction of users with a website and call center, treating visited URLs and calls as data elements and users as the common property. In this mechanism, the results of LDA are used to find call center subjects given website visits (web and application server visits) that are associated with them via LDA topics. The reverse or any combination thereof, including other embodiments that utilize logs from chat, email, social media or voice transcriptions are feasible.

The subject embodiments are thus directed to a method for processing informational items originating from a plurality of information sources into a document for topical analysis thereof. Informational items are collated from a one of the sources in accordance with a predetermined plurality of relevant attributes and a key property value common to selected ones of the relative attributes. All informational items from the plurality of sources associated with the key common property value are grouped to form a document. Informational items therein are marked by the informational source thereof. The automatically derived document then can be analyzed for topical identification. This derived document also contains markers that can in subsequent stages help in identifying a label to groupings of such documents.

In accordance with other aspects of the subject embodiments, a system is provided for transforming a plurality of informational items from a plurality of diverse informational sources into a plurality of topic analyzable documents, each having a key property value relative to the informational items therein, and for analyzing the documents for topical identification. A first data repository stores a plurality of informational items segregated by informational items source wherein the plurality of informational items are addressed therein by item-relevant attributes, and wherein one of the item-relevant attributes is predetermined as the key property value common to selected ones of the relevant attribute. A second data repository stores the informational items associated by key property value as a plurality of distinct topic analyzable documents, wherein the informational items in each one of the documents are grouped as a sequence of informational item strings, each string being identified by informational source thereof. A processor then analyzes the formed documents for topical identification. The processor includes a process for linking selected ones of the informational item sources in accordance with the detected relationship of the analyzing of documents.

DETAILED DESCRIPTION

Figure 1:
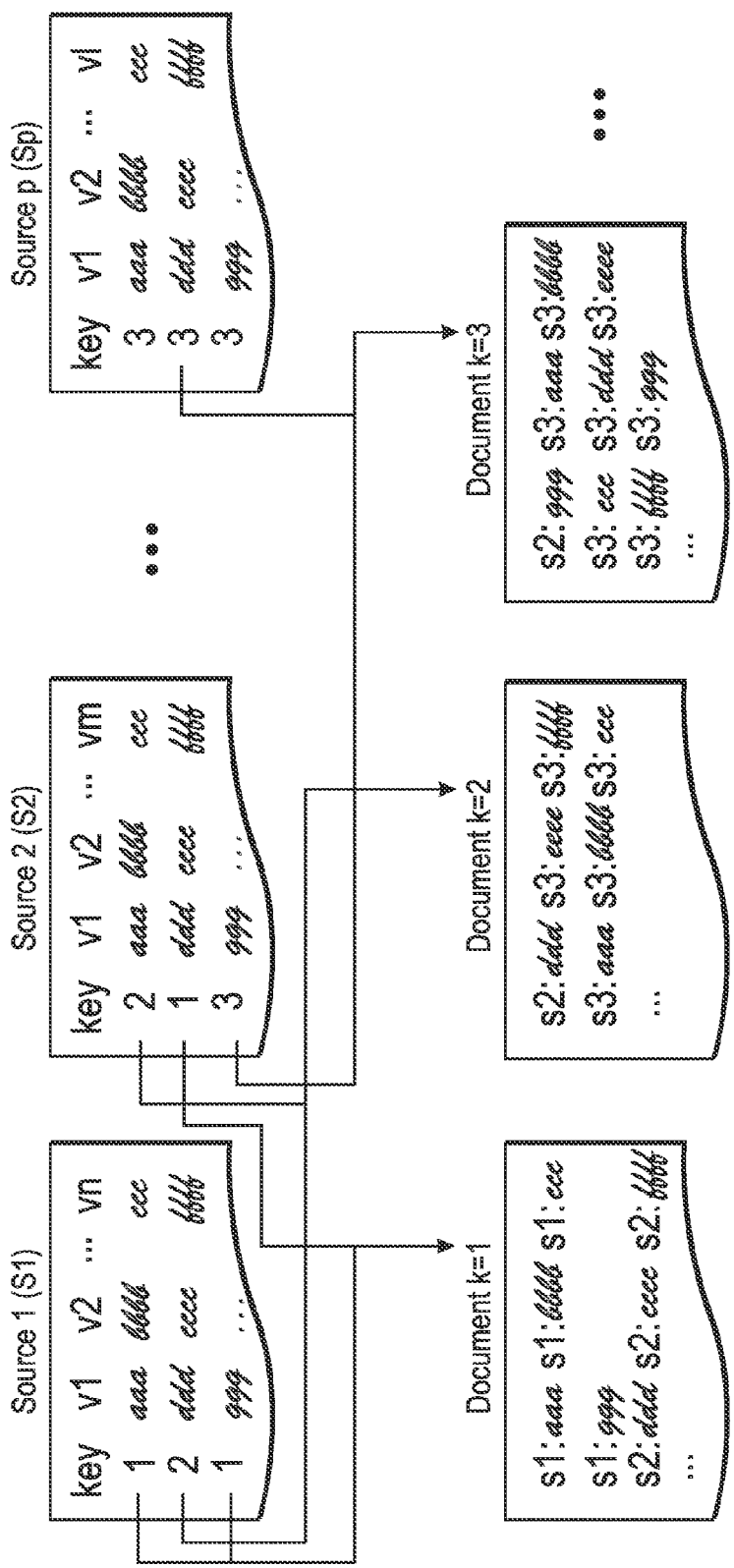
FIG. 1 is a block diagram showing the data transformation process for a plurality of informational items from source listings to document groupings.

FIG. 1 is a general representation of a document generating method that can be used to produce documents from multiple linked data sources in accordance with the subject embodiments. A plurality of sources of record informational items, (S1), (S2), ... (Sp), are shown to include a plurality of collated informational items, aaa, bbb, ccc, etc. The informational items are collated and addressed within the record listing by relevant attributes, v1, v2, ... $v_m$ ($v_i$) and a key attribute 1, 2, 3 (or k1, k2, k3) that is a key property value common to selected ones of the relevant attributes. Such record listings include informational items comprising logs, notes and events from automated business and software processes. Further examples thereof are web logs, customer service representative notes, phone call logs and event logs, although similar types of items are included within the scope of the subject embodiments. The items aaa, bbb, etc., can be stored in any of a variety of known types of data repositories.

Figure 2:
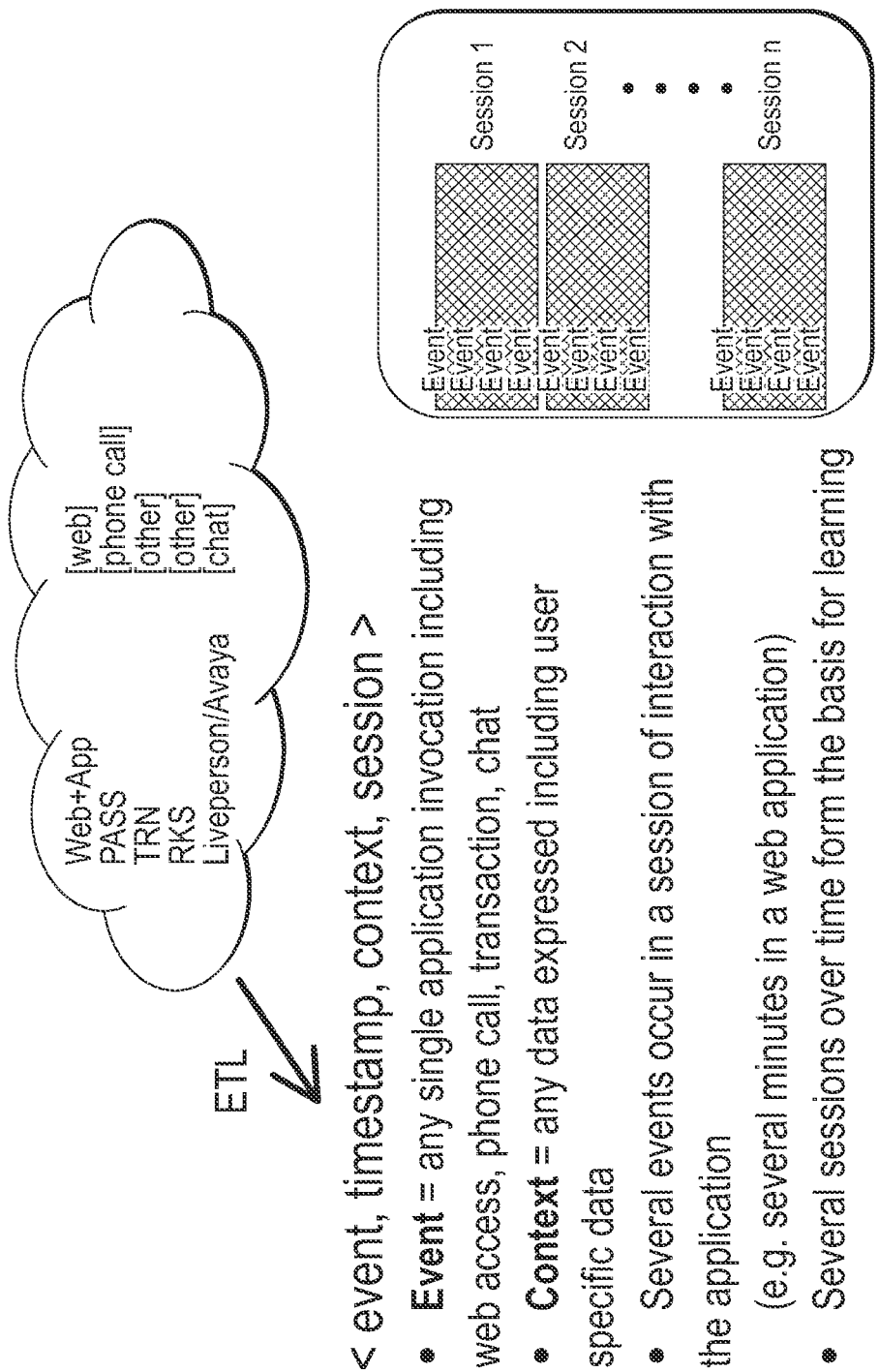
FIG. 2 is an event abstraction for establishing information groupings on multi-application event logs.

With reference to FIG. 2, a diagrammatic representation of the available statistical collection from a time window composed of multiple application sources (web, application server, calls, chat sessions, etc.) are collected. Typically the scenario will arise when correlation analysis needs to be conducted with data from multiple sources of data that a company or entity will typically track. The subject embodiments exemplary reference various information systems that are used to track a human resources and benefits processing service. These sources of information are aggregated and exhibited in a common data abstraction that minimizes the disparity between the applications but captures the context in a bag of words approach (such is best exploited by an LDA document analysis technique). As shown in FIG. 2, the informational item is identified by event, timestamp, context and session. Sessions can typically comprise a predetermined period (day, work period, quarter, etc.) that would appear to make, relevant sense to the user/analyzer of the informational items. Multiple events can occur in a number of sessions (Session 1 ... Session n)

Returning to FIG. 1, it can be seen that the source files, (S1) ... (Sp), are organized as a list of records, and then each record is composed of a number of attribute columns, v1, v2, ... $v_m$ ($V_i$). At least one attribute, called a key, k1, k2, k3, is common to all source documents, and all documents contain at least one of the other attributes ($v_i$). Note that this organization does not imply that the source documents need to have a structured format as shown, as long as the data can be extracted from unstructured data. By way of example, s1 could be seen as a website visit, attribute $v_i$ could be seen as an attribute of the visit such as a product delivery schedule, a technical inquiry or complaint. The key common property value to the informational items, can be a particular communicant/user. Thus, with reference to Source 1, a particular Communicant, key 1, visited the website s1 and generated informational items aaa, bbb, ccc, ggg. Another Communicant, identified as key 2 operates informational items ddd, eee, fff.

The transformation of informational items from a record listing by source to an analyzable document is represented by a plurality of documents resulting from the transformation process. More particularly, documents k=1, k=2 and k=3 are shown in the Figure as groupings of informational items from the plurality of sources all associated with the same key common property value to form the document. It can be seen that document k=1 is a compilation of informational items from both source 1 and source 2 where the key common attribute value is the same, i.e., key 1. Thus the informational items have been transformed into groupings forming the document comprising a plurality of sequences of informational item strings. Strings are also marked (S1) (S2) for indication of a corresponding one of the sources of informational items, but it is clear that all of the informational items in a single document all have a same key property value. Continuing with the example above, if the key is the same common property value, then all the informational items in document k=1 will be from the same communicant but from different information sources. The document can be stored in a second data repository.

As it is desired that the formed document be susceptible for LDA analysis, it is preferably sized to include a searchable collection of informational items. The informational content can, in addition to keywords and other content derived from the sources, be meta-data, data derived from human comments (such from call center agents), synonyms from sources, tags from publicly available data sources such as Freebase or Wikipedia, or human transcriptions of written logs. This additional information can be utilized to have enhanced the content of the derived document.

Figure 3:
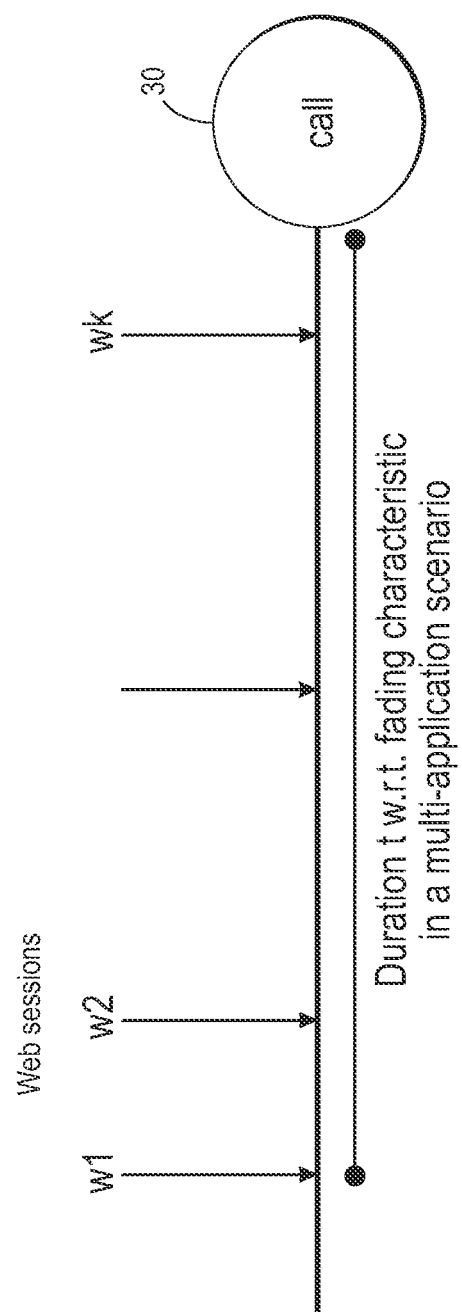
FIG. 3 is a timeline of web session events precedent to a call to a call center.

With reference to FIGS. 2 and 3, one notable feature of the embodiments is that it can be recognized that correlating sessions from multiple applications have a fading characteristic. For example, several web sessions with an unresolved issue or open questions may lead to a subsequent phone call or a chat session. Accordingly, it may make sense to consider the precedent web sessions to a particular phone call. If such a fading characteristic is in place, long range correlations typically make no sense in a human resources application as conditions in human resources are typically determined by events in the near past (i.e. fading characteristic). FIG. 3 shows a timeline of a plurality of web sessions, w1, w2, ... wk preceding a phone call or chat session 30. A link can be assigned with particular informational items resulting from the call including consideration of the fading characteristic in a multi-application scenario. In this case, web session w1 will have less consequence to the purpose of the call than wk.

All the multi-application sessions and logs are aggregated to form a stream of logs preceding an event of choice. In this stream, a search is made for a given event type preceding the target event, i.e. in FIG. 3, w1-wk can be all of the same event type preceding the call. In any case, this merging, sorting and search of this event stream can occur in a distributed fashion. Events may include tags by users or notes from customer-service personnel. Identifying which application the tags and notes came from is relevant as are which application the aforementioned events came from.

Individual sessions may sometimes not make enough sense to be analyzable. So some sessions should be combined. W1-W5 could be a combined session 1.

W6-W9 could be a combined session 2 from a different application. W10 to Wk could be combined session 3 from a different application. As noted above, the combination is to enhance the ability to perform LDA type analysis.

Mathematically, the subject transformation process can be represented as such:
Let $$K = \bigcup_{s=1}^{p} keys_s$$

be the set of all key values across p sources, where $keys_s$ is the set of keys contained in source s. There will then be |K| output documents, each corresponding to a different key in K. Then, for each key k∈K and source s, extract the set of records R from s with key k. Finally, insert s•$v_{ir}$ (where • stands for concatenation) in document k for every attribute value $v_i$ of each record r∈R.

Note that the output documents are not organized as lists of records like the source documents, but rather as sequences of strings, which correspond to the concept of words in the context of LDA. Consequently, the output documents can be used as input to a standard LDA implementation to obtain a topic distribution for all the words (strings) in the documents.

Analysis to identify topic groups from the documents is then performed. As mentioned above, LDA produces a distribution $P_{ij}$ of the probabilities of each word i for each topic j∈[1,t], where the number of topics t is an input parameter of the LDA algorithm. A topic is an abstract notion of the LDA model which simply represents a particular probability distribution over the set of words. Therefore, it is possible to characterize a topic j by the set of words i that are most likely for that topic (i.e. with relatively higher values of $P_{ij}$). One way to do this is to select a group of the n most likely words for each topic. Another is to select a threshold value z, such that word i is selected for topic j if $P_{ij}$>z.

Two elements from different sources are associated by a topic j if they belong to the same topic group according to one of the two definitions above. Recall that it is possible to identify elements from different sources because their corresponding words are prefixed by a source tag.

As an example of the above method, consider data from two sources that corresponds to the interaction of users with a web portal and a call center, both of which manage the same type of user data. The web portal data consists of logs of users' navigation actions (i.e. visits to URLs within the portal), grouped into sessions. The call center data consists of logs of users' calls, including the subject of the call (with a particular classification scheme) and other information. For the purposes of the example, then, there are two sources with a key attribute corresponding to the user ID, and at least one relevant attribute each: the URL from the web logs and the subject from the call center logs.

It is evident from the description above that the result of the application of the subject document generation method is a set of documents, one per user ID, that contain words corresponding to all of the URLs visited by the user and all of the subjects of the calls made by that user.

An important benefit of the subject analysis is link prediction. Topic groups can be used for prediction because of the association existing between the elements that are grouped together. In general, if presented with one or more elements, it is possible to obtain the most likely topic group(s) for them and use other elements from those groups as predictions, discriminating by the source prefix.

The semantic interpretation of the prediction, of course, depends on the nature of the elements and on the relation between the different sources. In the particular example given above of the web page URLs and call center subjects, both data sources are complementary, in that a user may use both to resolve a particular issue, often prompted by insufficiencies in one or the other (e.g. could not find all information online) or follow up (e.g. taking action online after resolving questions over the phone). Therefore, topic groups may reflect these complementary associations by grouping together call subjects and URLs that are frequently accessed together by users.

The following methods are proposed for making predictions based on LDA results for multiple source data. Other methods for LDA recommendation and topic folding found in the known art may be similarly applied.

Method 1:
Given one word w, from source s, obtain the most likely topic (t*):

$$t^* = \arg\max_j P_{wj}$$

The prediction is then the set $$L = \{v | v \in G_{t^*} \wedge source(v) \neq s\}$$

where $G_{t^*}$ is the topic group for topic t* and the source operator obtains the source prefix from a given word.

Method 2:
Given m words $w_i$ from a set of topics S, obtain the most likely topic as:

$$t^* = \arg\max_j (f(P_{wj}))$$

where w denotes the vector of m words and f is an aggregation function for the m corresponding likelihood values in P (for example average or some other linear combination). The final prediction set L would then be obtained as:

$$L = \{v | v \in G_{t^*} \wedge source(v) \notin S\}$$

This method works under the assumption that the input set corresponds to a single or predominant topic.

Method 3:
Given m words $w_i$ from a set of topics S, apply method 1 independently for each word to obtain sets $L_{w_i}$. Afterward, obtain a final set L by extracting n words from the m sets, either as:
  The top n/m words from each set, given P
  The top n pages from $$\bigcup_i L_{w_i},$$

ranking pages by an aggregation f'($P_{wt^*}$) of the likelihood values of each word across all of the m topics (denoted by t*).

This method works under the assumption that the input set can have multiple topics and that the prediction must account for them.

The foregoing methods provide systems for linking selected ones in a plurality of information sources having a detected relationship from the analyzing of the topical identification. In the example given, linking comprises a practical way of finding/predicting call centers subjects given web site visits of a user thereof. Such a user event likelihood prediction can be very useful to the owners of the informational item data especially where the predicting comprises predicting an informational source link of a user of the sources relative to an identified topic.

Figure 4:
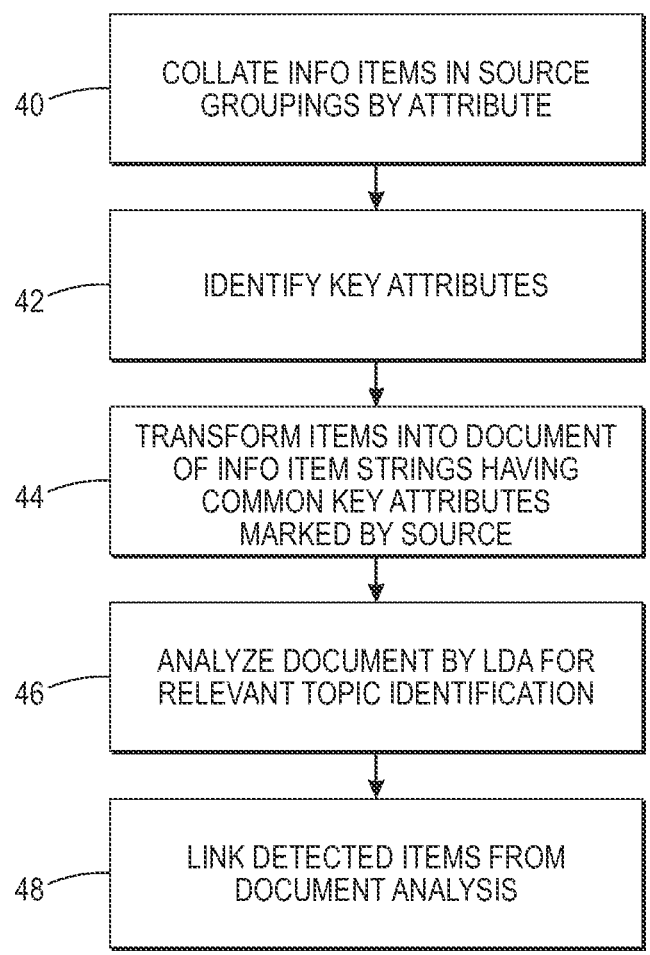
FIG. 4 is a flowchart of steps for multi-source informational item grouping as part of a document analysis.

With particular reference to FIG. 4, a flowchart summarily illustrating steps and implementing the subject embodiments is shown. The informational items are first collated 40 in source groupings (S1, S2, etc.) by relevant attribute. A key 1, 2, 3 of the attributes is identified and can be used as the primary attribute for forming analyzable documents from the collated informational items. The informational items are then transformed into the documents k1, k2, etc. as informational items strings having common key attributes marked by the generating informational source. Document sizing can be a few tens to few hundreds of words and other meta-data words gathered as per spec. The documents can then be analyzed 46 by a technique such as LDA for relevant topic identification therein and then the relevant information items detected from the document analysis can be linked 48 to form predictions or associations between the informational items themselves or relevant communicants after the verb linking.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for processing informational items of low information content originating from a plurality of diverse information sources into a derived document suitable for selected topical analysis thereof, comprising:
    collating via a processor, informational items from a one of the sources in accordance with a predetermined plurality of relevant attributes of the low information content, and a key property value common to selected ones of the relevant attributes wherein the informational items individually lack sufficient content for the selected topical analysis;
    grouping via the processor, all informational items from the plurality of diverse information sources associated with the key common property value to form an enlarged document having a grouped content sized for the selected topical analysis, wherein the informational items therein are marked by the informational source thereof; and,
    analyzing the document for topical identification.

2. The method of claim 1 wherein the collating of informational items includes collecting records comprising logs, notes and events from automated business and software processes.

3. The method of claim 2 wherein the collating of informational items further includes collecting information content comprising web logs, customer service representative notes, phone call logs and event logs.

4. The method of claim 1 wherein the grouping all informational items comprises the forming of the document sized with a predetermined amount of document content susceptible for known document analysis techniques for the analyzing.

5. The method of claim 1 further including linking selected ones of the plurality of information sources having a detected relationship from the analyzing of the topical identification.

6. The method of claim 5 wherein the linking comprises finding call center subjects given website visits of a user thereof.

7. The method of claim 5 wherein the method further includes predicting a user event likelihood.

8. The method of claim 1 wherein the predicting comprises predicting an informational source link of a user of the sources relative to an identified topic.

9. The method of claim 1 wherein the collating of informational items in accordance with the plurality of relevant attributes includes listing by association selected informational items having a common relevant attribute.

10. The method of claim 9 wherein the grouping to form the document comprises generating the document as a plurality of sequences of informational item strings marked for indication of a corresponding one of the sources of the informational items, and wherein the plurality of sequences in the document all have a same key property value.

11. A system for transforming a plurality of informational items from a plurality of diverse informational sources into a plurality of topic analyzable documents each having a key property value relative to the informational items therein, and for analyzing the documents for topical identification, the system comprising:
    a first computerized data repository for storing a plurality of the informational items segregated by informational item source wherein the plurality of informational items are addressed therein by item relevant attributes of content of the informational items, and wherein one of the item relevant attributes is predetermined as the key property vale common to selected ones of the relevant attribute;
    a second computerized data repository for storing the informational items associated by the key property value as a plurality of distinct topic analyzable documents, wherein the informational items in each one of the documents are grouped as a sequence of informational item strings, each string identified by an informational source thereof; and a processor for analyzing the documents for the topical identification.

12. The system of claim 11 wherein the topical analysis comprises latent dirichlet allocation.

13. The system of claim 11 wherein the informational sources comprise web logs, customer service representative notes, phone call logs and event logs.

14. The system of claim 11 wherein the processor includes a process for linking selected ones of the informational item sources in accordance with a detected relationship from the analyzing of the documents.

15. The system of claim 14 wherein the process for linking includes a link of a call center subject based upon precedent website visits.

16. The system of claim 14 wherein the process for linking includes a prediction of a user likelihood call to a call center based upon precedent website visits.

17. The system of claim 14 wherein the processor includes a process for considering fading characteristics of informational items.

* * * * *